United States Patent [19]
Sciaky

[11] 3,742,365
[45] June 26, 1973

[54] ELECTRON BEAM WELDER INCORPORATING SLIDING SEAL MEANS

[75] Inventor: David Sciaky, Chicago, Ill.
[73] Assignee: Welding Research, Inc., Chicago, Ill.
[22] Filed: Feb. 15, 1972
[21] Appl. No.: 226,611

[52] U.S. Cl.................. 219/121 EB, 285/DIG. 19
[51] Int. Cl............................................. B23k 15/00
[58] Field of Search................ 219/121 R, 121 EB, 219/121 EM; 277/94, 214, 215; 285/DIG. 18, DIG. 19

[56] References Cited
UNITED STATES PATENTS
3,222,496  12/1965  Windebank.................. 219/121 EB
3,626,142  12/1971  King............................ 219/121 EB

*Primary Examiner*—J. V. Truhe
*Assistant Examiner*—Gale R. Peterson
*Attorney*—Julius L. Solomon

[57] ABSTRACT

The present invention relates to apparatus for welding by means of an electron beam and describes a sealing system which allows a machine member carrying an electron beam gun and a second member carrying parts to be welded to slide one with respect to the other while maintaining a low pressure in the electron gun and the area surrounding the parts to be welded. The sliding seal apparatus is applied to linear or rotary translation of the electron beam gun support means with respect to the work holding means.

7 Claims, 6 Drawing Figures

ELECTRON BEAM WELDER INCORPORATING SLIDING SEAL MEANS

The present invention relates to apparatus for welding by means of an electron beam and, more specifically, to a sealing method and system which allows a machine member carrying an electron beam gun to slide with respect to a vacuum chamber which is provided with a means whereby the electron beam generated in the electron gun may pass from the externally mounted electron gun into the evacuated chamber in which parts to be welded are mounted.

In the past, attempts have been made to utilize machines of this nature but experience has shown that the sealing means between the plates which slide one with respect to the other have proven to be unsatisfactory, being subject to rapid wear, excessive frictional resistance between the two moving parts and leakage of gas, rendering the seal ineffective. An example of this old type of sealing means is illustrated in U.S. Pat. No. 3,136,883. When using an O-ring seal, as is described in this latter patent, it is found that the motion of the sliding plate running parallel to the O-ring seal causes the seal to bunch up and wrinkle as it is urged in the direction of travel of the plate so that soon a leak develops at the leading end of the seal. The bunching up of the O-ring creates a resistance to motion of the plate and, due to the pressure concentrated at the high point of the O-ring, the O-ring wears unevenly.

It is the purpose of the present invention to provide a sealing means which will overcome these defects and inconveniences. An object of the present invention is to provide a sealing means utilizing ordinary O-rings which have an exceptionally long life. Another object is to provide an O-ring sliding seal system in which the frictional resistance does not change during the stroke over the length of the sliding motion. Another object is to provide a sliding seal that is effective for sealing parts in either linear or circular motion with respect to one another.

The invention may better be understood by referring to the accompanying drawings.

Figure 1:
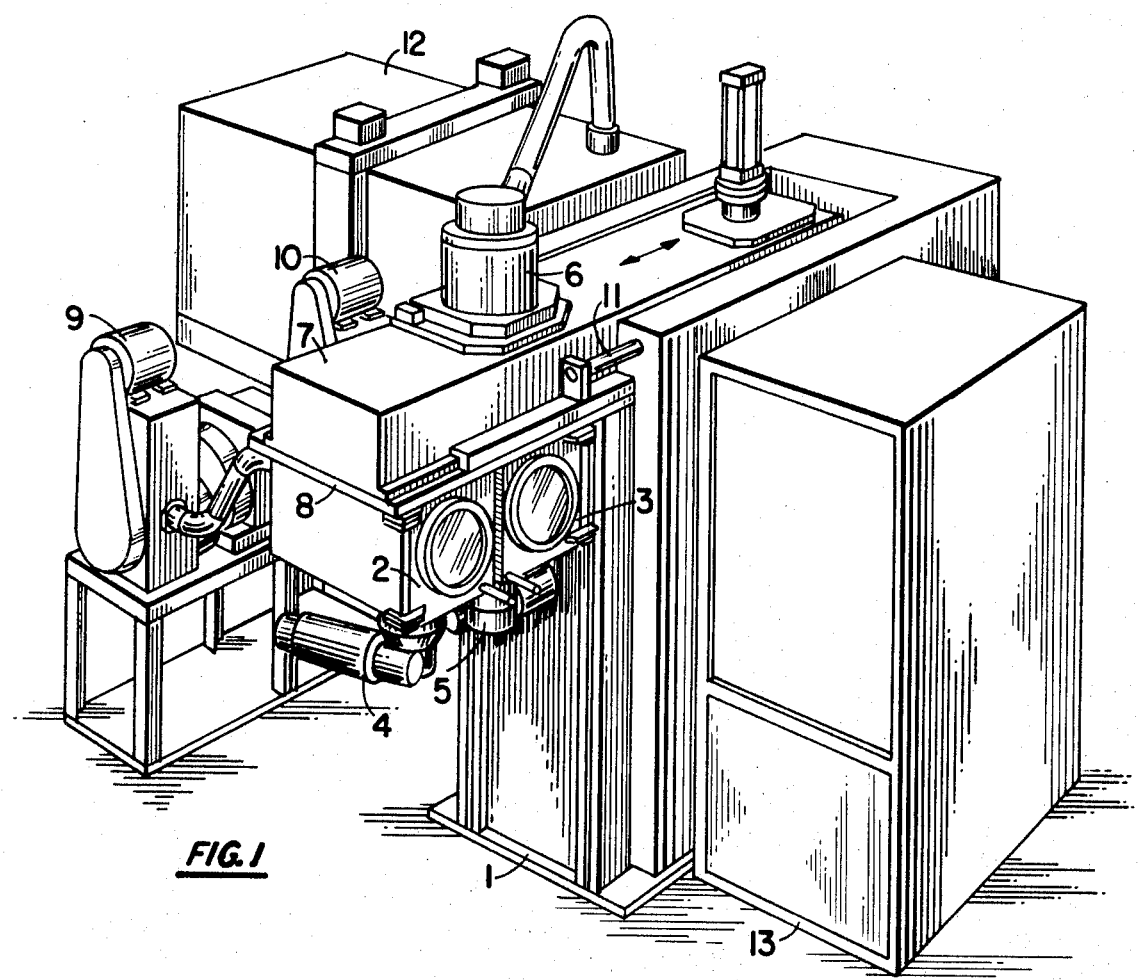
FIG. 1 is a perspective view of an electron beam welding machine which incorporates a sliding seal in accordance with the present invention.

FIG. 1 illustrates a typical electron beam welding machine utilizing the sliding seal of the present invention. The rigid framework 1 supports the electron beam chambers 2 and 3 which adjoin each other. The sliding seal plate 8 covers the two vacuum chambers and carries in a groove which has been milled into its upper surface a conventional O-ring continuous flexible seal. The electron beam gun mounted in the gun housing 6 is supported on the structure 7 which is designed to slide, in the direction indicated by the arrows, on the seal plate 8. The seal plate 8 has a slot machined along a portion of its length through which the electron beam generated by the electron gun is allowed to pass into the vacuum chambers so as to impinge upon the work pieces to be welded. A motorized ball screw drive 11 is provided to actuate the gun support 7 carrying the electron beam gun so that it may be caused to move from one end of its travel to the other. Vacuum pumps 9 and 10 are provided to evacuate the welding chambers 2 and 3. Work clamping means are provided within the chamber and work drive means 4 and 5 are provided to move the work within the chamber during the welding operation so that welding may be accomplished along a desired path. A high voltage power supply 12 provides the power supplies required to generate and accelerate the electron beam and a control cabinet 13 contains all the control required to operate the machine. In operating the machine, chambers 2 and 3 are at first open to allow the work pieces to be mounted on the tooling within the chambers. The chambers are then closed and evacuated to the pressure required for welding — approximately 100 microns — the electron beam gun adjusted in position over one of the piece parts, and the welding of the first piece start then accomplished. The gun support and housing is then slid over the seal plate so that the electron gun is in the proper position for the welding of the part in the second chamber. While the welding is going on in the second chamber, the first chamber is opened to the atmosphere, the welded part removed and another unwelded part placed in the tooling. The chamber is then pumped down and when the welding is completed in the second chamber, the gun support is slid over the seal plate 8 so that the electron beam gun is in the proper position over the piece part in the first chamber.

Another type of machine may require the welding of a continuous seam perhaps 30 to 40 inches long. In this case only one vacuum chamber would be required into which the parts would be placed and the gun support slide 7 would move along the sliding seal plate 8 for the length of the 30 or 40 inch travel required.

Figure 2:
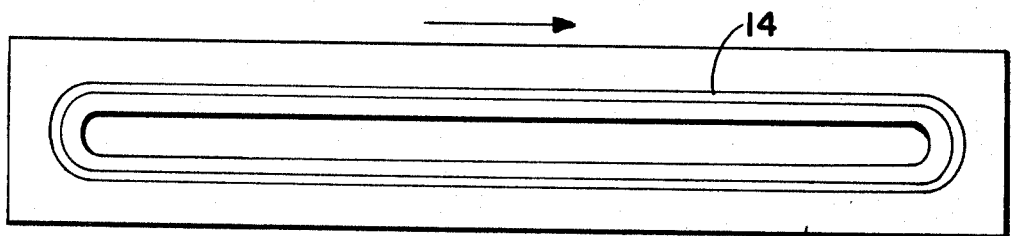
FIG. 2 is a top view of a seal plate carrying an O-ring seal in accordance with the prior art, and, FIG. 3 is a top view of a linear motion seal plate made in accordance with the present invention.

FIG. 2 illustrates the configuration of the seal which has been used previously for this type of work. The O-ring 14 is mounted in a groove which for most of its length runs parallel to the motion. When the gun support slide moves in the direction as indicated by the arrow over the stationary seal plate 15, the material in the O-ring 14 is forced towards the right. The seal material bunches up, wrinkles form, creating openings so that the air may leak into the vacuum chamber and increase the pressure so that the electron beam welding process cannot continue.

Figure 3:
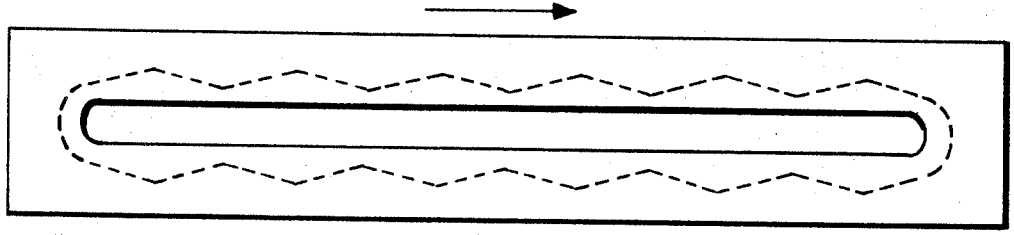

FIG. 3 illustrates the sliding seal plate made in accordance with the present invention. An ordinary O-ring seal is placed in the groove which has been milled along a path as shown by the dotted lines in FIG. 3. When the support plate 7 carrying the electron beam gun moves in the direction of the arrow there will be no bunching or wrinkling of the O-ring inasmuch as the motion of the support plate 7 is always transverse to the O-ring. The O-ring being backed up by the sides of the O-ring groove cannot bunch in this direction but merely rolls slightly to the side wall of the groove and is supported by it. It has been found that seal plates utilizing the zig-zag O-ring groove path as shown in FIG. 3 operate smoothly and retain their sealing ability and have exceedingly long life and make it possible to produce electron beam welding machines which will operate reliably and satisfactorily without exceptional maintenance over long periods of time so that the electron beam welding process for high production industry becomes practical.

Figure 4:
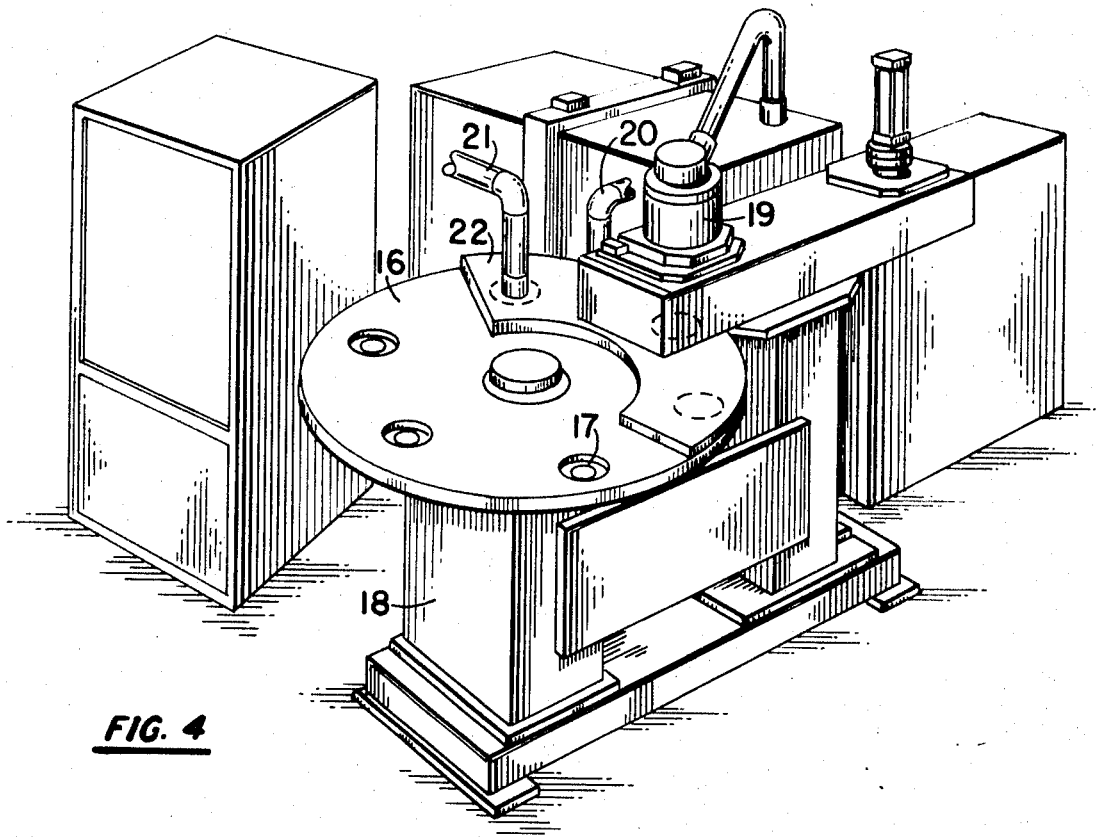
FIG. 4 illustrates an electron beam welding machine incorporating the novel sliding seal means which utilizes a dial feed work transport mechanism for use in high production applications.

FIG. 4 illustrates an electron beam welding machine for use in high production industry to produce parts at high speeds on a continuous basis. The machine includes a circular table 16 which incorporates a number of sealable pockets 17 disposed at equal distances from each other along a circle towards the edge of the plate and a seal plate against which the table slides so as to bring a different group of pockets to predetermined positions under the seal plate intermittently. Parts to be electron beam welded may be placed upon a suitable fixture within the pocket 17 at the position A on the table 16 and the table caused to rotate by an automatic indexing mechanism 18 which indexes the table intermittently from the loading position into a first prepumping station and then through a second pumping area where the pocket is pumped down to the pressure suitable for welding, to a position underneath the electron beam gun 19 at which point the part is welded during the dwell time of the indexing mechanism. The part continues then through a pre-ejection area and finally to the ejection station B where it may be unloaded from the machine.

Figure 4A:
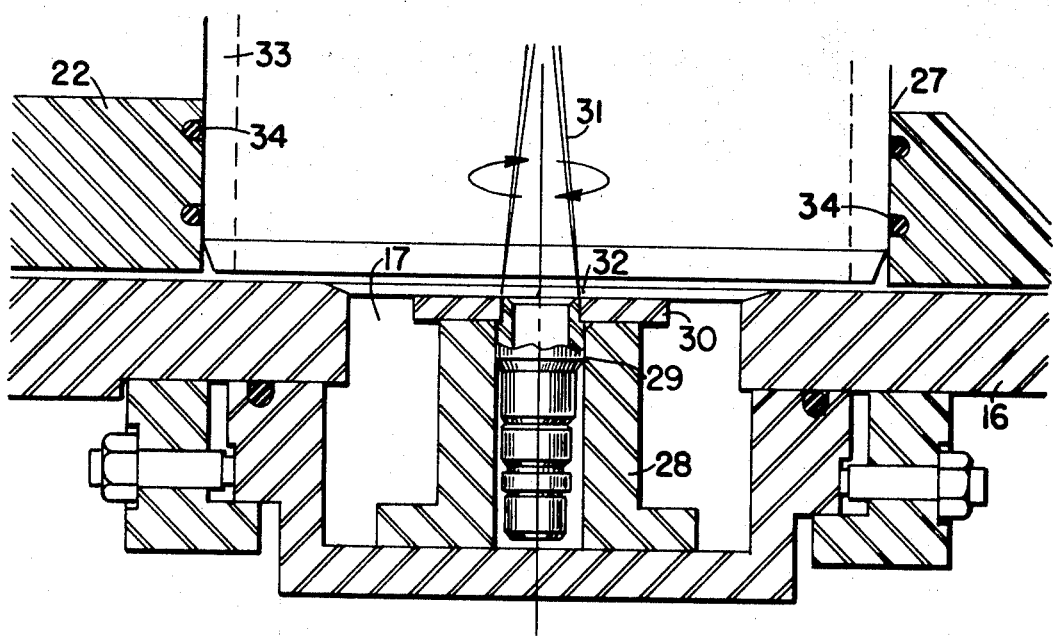
FIGS. 4A and 4B illustrate some details of the dial feed machine of FIG. 4.
Figure 4B:
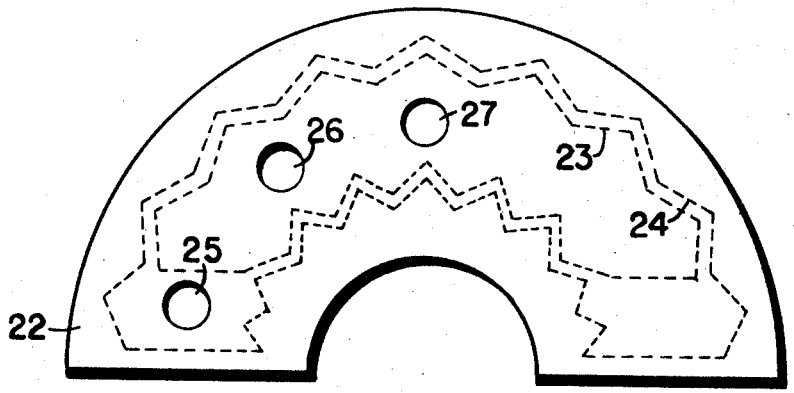

O-ring seals are arranged on the seal plate 22 in the configuration shown by the dotted lines on FIG. 4B so as to form two separate volumes between the table 16 and the seal plate 22. An inner volume enclosed by the inner seal 23 and a second volume between the inner seal 23 and the outer seal 24. The inner O-ring seal of zig-zag configuration closes off the area around the pocket containing the part underneath the welding gun. The second outer seal 24 of zig-zag configuration seals off the volume surrounding the first seal 23. The sealing plate 22 is connected to a first pumping means, through a hole 25 in the seal plate and piping 21, which partially evacuates the pocket 17 which is in the first pumping station. A second pumping means through the tubing 20 and a second hole 26 in the seal plate evacuates the space enclosed by the inner seal 23. The electron beam gun is disposed over a third hole 27 in the seal plate through which the electron beam may pass and is supported and sealed in such a way that the pocket carrying the piece part which is directly below the gun may easily be maintained at a pressure of approximately 50 to 100 microns.

FIG. 4A is a section taken at the welding station of a portion of the rotating table 16 showing one of the sealable pockets 17 and tooling 28 used to hold the parts 29 and 30 being welded. In the case illustrated the weld is made along the circular path 32 which defines the joint between the parts 29 and 30. The electron beam 31 is caused to traverse the circular path 32 through the action of suitable and well known electron beam deflection means associated with the electron gun. The electron gun housing 33 is fitted to the seal plate 22 through the hole 27 and is sealed to the seal plate with flexible seals 34 so that the space below the gun may be maintained at the desired gas pressure.

By means of this seal plate the small inner volume containing the pocket holding the part which is to be welded is sealed and pumped and the second volume surrounding the first volume between the seal plate and the rotating disk is maintained at some slightly higher transitional pressure between the atmospheric pressure and the pressure required at the welding position. By means of the novel zig-zag configuration of the flexible sealing means utilized to form the seal between the seal plate and the rotating turn table it has been found that the turn table may be operated on a continuous basis for exceedingly long periods of time without excessive wear of the sealing means. Bunching and wrinkling of the O-ring is eliminated and dial feed machines for the electron beam welding of parts at high production rates become feasible, practical and economical.

Although specific forms have been illustrated to describe the invention, the invention is not limited to these forms or to such modification of them as may be obvious to the skilled man of the art.

What I claim is:

1. An electron beam welding machine for the continuous welding of parts in series comprising a circular table, a seal plate disposed above said circular table, sealable pockets arranged equidistant from each other adjacent the outer edge of the said table, means within said pockets for supporting workpieces to be welded by an electron beam means for rotating the said table in stepwise fashion against a pair of continuous flexible seals mounted in zig-zag concentric form upon the said seal plate so as to form two sealed spaced between the table and the seal plate, means for positioning one of said pockets so that it communicates with one of said spaces which is maintained at a desired welding pressure while the following pocket is positioned so that it communicates with the second space which is maintained at a pressure intermediate to the atmospheric pressure and the welding pressure so as to partially evacuate the pocket, means for evacuating each of said spaces, means for generating, focusing and deflecting a beam of electrons, and means for indexing each of said pockets in sequence into a position under the said electron beam means for a preset interval of time.

2. An electron beam welding machine, as in claim 1, wherein said pair of flexible seals comprises, at least two endless resilient flexible sealing means supported on a single plane of the said fixed member and arranged so that each one is positioned wholly within the one next largest so as to form separate sealed spaces bounded by the innermost seal and the said fixed and movable members and between each pair of adjacent seals and the said fixed and movable members, the said sealing means being so arranged that it does not lie tangent to a line parallel to the direction of motion of the movable member except at such points where there is a reversal in path of the seal transverse to the direction of motion.

3. An electron beam as in claim 2 welding machine which each of the said spaced communicates with a separate vacuum pump.

4. An electron beam welding machine as in claim 2 in which each of said spaces is maintained at a progressively lower gas pressure with the highest pressure in the outermost space.

5. An electron beam welding machine as in claim 2 in which each of the said flexible seals is arranged in zig-zag form.

6. An electron beam welding machine as in claim 2 comprising two of said endless seals.

7. An electron beam welding machine as in claim 6 in which the pressure in the innermost space is maintained at a gas pressure of approximately 50 microns and the pressure in the second space between the two said seals is maintained at a pressure intermediate to 50 microns and the atmospheric pressure.

* * * * *